United States Patent
Klein et al.

(10) Patent No.: US 10,324,900 B2
(45) Date of Patent: Jun. 18, 2019

(54) COMPUTER STORAGE SYSTEMS AND METHODS OF MANAGING DATABASE SERVER APPLICATIONS

(71) Applicant: Toshiba Memory Corporation, Minato-ku, Tokyo (JP)

(72) Inventors: Yaron Klein, Raanana (IL); Allon Leon Cohen, Modin (IL)

(73) Assignee: Toshiba Memory Corporation, Tokyo (JP)

( * ) Notice: Subject to any disclaimer, the term of this patent is extended or adjusted under 35 U.S.C. 154(b) by 432 days.

(21) Appl. No.: 14/657,321

(22) Filed: Mar. 13, 2015

(65) Prior Publication Data
US 2016/0267102 A1    Sep. 15, 2016

(51) Int. Cl.
*G06F 16/172*    (2019.01)

(52) U.S. Cl.
CPC ................ *G06F 16/172* (2019.01)

(58) Field of Classification Search
CPC ................................ G06F 17/3048
See application file for complete search history.

(56) References Cited

U.S. PATENT DOCUMENTS

| | | | |
|---|---|---|---|
| 6,073,137 A * | 6/2000 | Brown | G06F 9/4443 |
| 7,136,966 B2 | 11/2006 | Hetrick | |
| 7,509,589 B2 * | 3/2009 | Hallisey | G06F 3/0482 |
| | | | 707/999.202 |
| 8,560,775 B1 | 10/2013 | McDuffee et al. | |
| 2013/0080388 A1 * | 3/2013 | Dwyer | G06F 17/3048 |
| | | | 707/634 |
| 2013/0086324 A1 * | 4/2013 | Soundararajan | G06F 12/0813 |
| | | | 711/122 |
| 2013/0318391 A1 | 11/2013 | Kazemi et al. | |
| 2014/0149650 A1 * | 5/2014 | Caulkins | G06F 17/30132 |
| | | | 711/104 |

OTHER PUBLICATIONS

Wikipedia, Non-Volatile Memory, <https://en.wikipedia.org/wiki/Non-volatile_memory>, May 9, 2018. (Year: 2018).*

* cited by examiner

*Primary Examiner* — Hung Q Pham
(74) *Attorney, Agent, or Firm* — White & Case LLP

(57) ABSTRACT

Systems and methods including a database server application integrated with a non-volatile memory-based cache. The database system is configured for accelerating file system data file accesses of the database server application. The user can specify caching requirements in the terminology of the database server application. The system translates the specified caching requirements into cache directives and implements the cache directives in the non-volatile memory-based cache that satisfy the specified caching requirements.

22 Claims, 12 Drawing Sheets

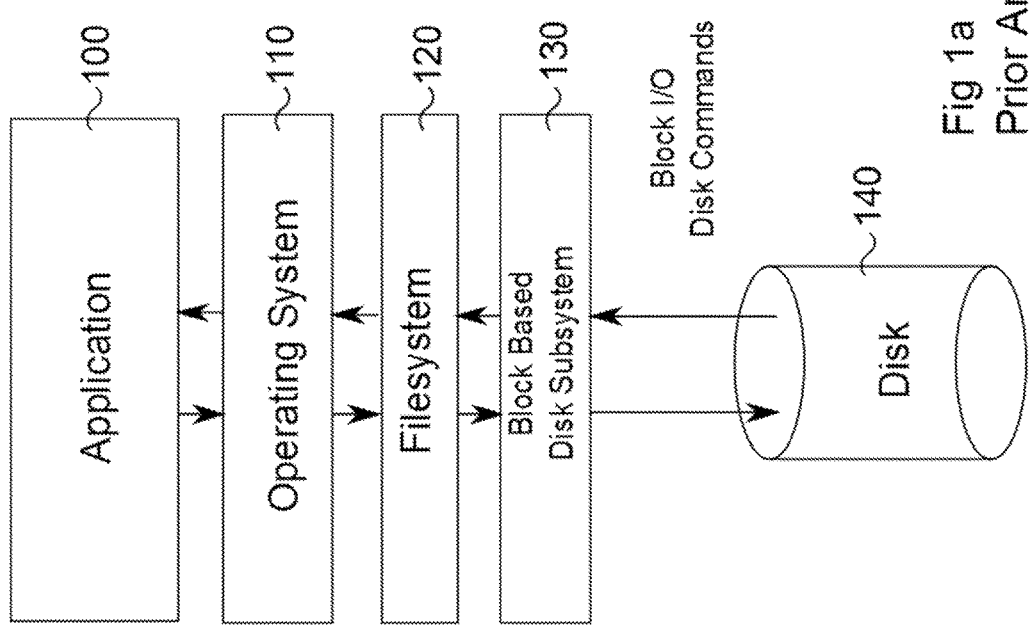

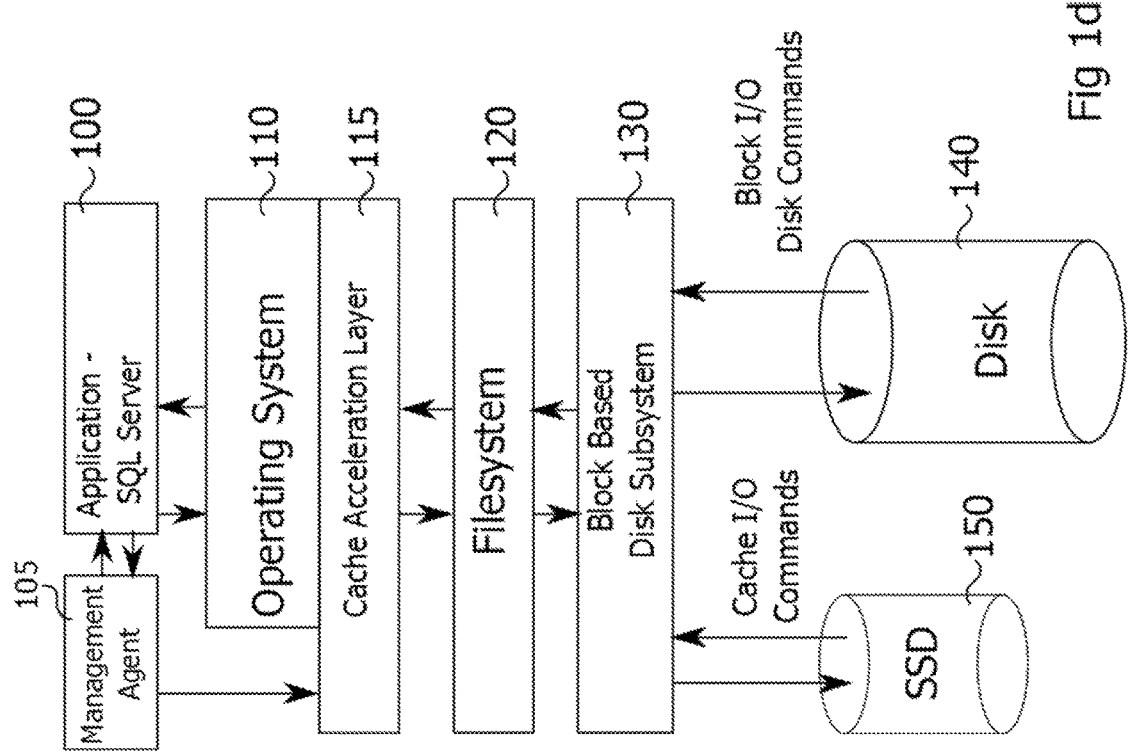

COMPUTER STORAGE SYSTEMS AND METHODS OF MANAGING DATABASE SERVER APPLICATIONS

BACKGROUND OF THE INVENTION

The present invention generally relates to database server acceleration and more specifically database server acceleration using non-volatile memory-based storage devices and cache acceleration software.

FIG. 1a shows a typical computer storage system. An application 100 will generally use standard application programming interfaces (APIs) provided by the operating system 110 to access functions for interfacing with system components such as graphics, storage, and networking. Storage APIs will generally be offered in terms of standard file-based operations including create, delete, open, close, read, write, append, etc. In each case, the operation will reference a file object. The operating system 110 will then use the services of a file system (filesystem) layer 120 which in turn uses a block-based disk subsystem 130 to issue basic block I/O disk commands to a physical bulk storage disk 140, which may be a hard disk drive (HDD) or solid-state drive (SSD).

Applications that require a high number of reads and writes (e.g. database applications) are typically limited by the latency and throughput of the data storage system. An SSD can provide much lower latency and better throughput performance than an HDD, but SSDs are much more expensive than HDDs and it may not be economical to implement a storage system for a large database purely with SSDs. However, applications can be accelerated more cost-effectively by placing frequently used data in a high-performance cache, such as a flash-based non-volatile memory cache, while retaining an HDD for the bulk or less frequently accessed data.

FIG. 1b shows such a computer storage system, where a non-volatile memory acceleration cache 135 is inserted in a storage stack between the block-based disk subsystem 130 and the disk 140. In this position, the acceleration cache 135 can inspect all the block I/O commands directed to the disk 140, all data being sent to the disk 140, and all data being returned from the disk 140. The acceleration cache 135 can choose to accelerate disk read, disk writes, or both. The general principle is that a data read can be serviced more quickly by reading the data from the acceleration cache 130 rather than the disk 140 or a data write may be serviced more quickly by writing the data to the acceleration cache 135 (to be written to the disk 140 at some later time when the disk 140 may be idle or not frequently accessed).

However, because of the position of the acceleration cache 135 in the storage stack, the acceleration cache 135 only sees raw disk I/O commands and therefore has no knowledge of a file system or file systems being used, which files and directories are being accessed, or which application is issuing the storage API command to access the storage (since there may be multiple applications running on the operating system 110). The acceleration cache 135 will therefore base its caching (cacheing) decisions based on criteria such as, but not limited to, the frequency of accesses to data according to a block address being accessed.

At least to begin with, all data accesses may be cached, but as the space in the acceleration cache 135 is limited, there may be no more space for new data accesses to be saved in the acceleration cache 135. In this case, criteria may be applied to select previous cache entries for removal to make space for the new entries. For example, an algorithm may be employed to select previous cache entries which are the Least Recently Used (LRU) or Least Frequently Used (LFU).

Regardless of what types of algorithms may be used to populate or de-populate the acceleration cache 135, they can only use the information that is available at the acceleration cache layer, which are commands to read or write blocks of data at specific addresses. This information does not enable the acceleration cache 135 to decide to add or remove cache entries based on what application 100 has issued the storage command, or the files that contain these blocks of data. The acceleration cache 135 is therefore unaware of the applications, files, and file systems being accessed.

SQL Server® is an example of a relational database management system developed by Microsoft Corporation. As a database application, it is a software product whose primary function is to store and retrieve data as requested by other software applications, be it those on the same computer or those running on another node across a network (including, but not limited to, the Internet).

As discussed above, the computer storage system represented in FIG. 1b provides a general cache system to provide storage disk command acceleration. However, a general solution does not provide a targeted or efficient acceleration performance in a situation such as a computer storage system running multiple applications. For example, the application may only access selected databases or even selected file groups or files. The computer storage system of FIG. 1b is not capable of individually accelerating these databases, file groups, or files. In addition, an individual node may run other activities which utilize the resources used as the acceleration cache 135. As such, the acceleration speed of the specific databases, file groups, or files being accessed by an application will likely be reduced as the resources will be equally utilized by any application running on the operating system of that node, which may include accesses originating from other nodes if they are operating in a network.

These issues are partially addressed in the computer storage system of FIG. 1c. Here, a file caching layer 115 is provided between the operating system 110 and the file system 120. In this case, the file caching layer 115 intercepts all the file system commands directed to the file system 120.

Unlike the example illustrated in FIG. 1b which is intimately involved with basis disk I/O commands, the file caching layer 115 is instead issuing file-based commands to the file system 120. As such, cache storage may now be provided by an SSD 150 where the disk subsystem 130 issues standard block I/O commands to both the SSD 150 and the bulk storage disk 140. The file caching layer 115 may be configured to know where to store cached files (the SSD 150) and the regular bulk files (the disk 140). As such, the file caching layer 115 will have knowledge of file objects being accessed.

However, all storage accesses are originated above and directed through the operating system 110, which makes the accesses anonymous to the file caching layer 115 in terms of the particular application 100 originally making the storage access request to the operating system 110. Hence, without the particular domain knowledge of the particular files and filenames being used, the file caching layer 115 still may not have sufficient knowledge in order to accelerate specific applications or files being used by an application. In general, this may require a considerable amount of user intervention in order to configure the cache, including but not limited to, by first identifying and then indicating to the file caching layer 115 which individual files to accelerate.

A recent version of SQL Server® 2012, includes new features and enhancements such as AlwaysOn® SQL, Server Failover, Cluster Instances, and Availability Groups which provide a set of options to improve database availability; Contained Databases which simplify the moving of databases between instances; new and modified Dynamic Management Views and Functions; programmability enhancements including new spatial features, metadata discovery, sequence objects and the THROW statement; performance enhancements such as ColumnStore Indexes as well as improvements to OnLine and partition level operations and security enhancements including provisioning during setup, new permissions, improved role management, and default schema assignment for groups.

To take advantage of these features and enhancements within a computer storage system of the type represented in FIG. 1b may be difficult, as the acceleration cache 135 is only aware of anonymous disk I/O commands. Similarly, information regarding the specific internal implementation that Microsoft chooses to employ for the organization of the databases, in terms of the directories and file names used, may not be publicly described. It may then require expert knowledge and analysis of the database system in order to determine which files are associated with which databases and features therein. This knowledge is unlikely to be known by a typical database user, nor by designers and architects of the databases, as they deal with higher level constructs and may be completely unaware of the file level implementation details. Therefore, it may also be difficult to configure a file-based caching system of the type illustrated by FIG. 1c to take advantage of these feature and enhancements in a complex relational database product such as Microsoft SQL Server® 2012.

In view of the above, it can be appreciated that there are certain problems, shortcomings or disadvantages associated with the prior art, and that it would be desirable if a computer storage system were available that is aware of databases, file groups, and files on a system in order to provide an efficient acceleration process tailored to the needs of users and capabilities of the database server applications and corresponding hardware.

BRIEF DESCRIPTION OF THE INVENTION

The present invention provides methods and systems for file-based caching of data with a management system that is integrated with a database server application, for example, the Microsoft SQL Server®.

According to one aspect of the invention, a database system includes a database server application integrated with a non-volatile memory-based cache. The database system is configured for accelerating file system data file accesses of the database server application. The user can specify caching requirements in the terminology of the database server application. The system translates the specified caching requirements into cache directives and implements the cache directives in the non-volatile memory-based cache that satisfy the specified requirements.

According to another aspect of the invention, a computer storage system includes at least one database having a plurality of data files, a database server application for managing the at least one database, the database server application running on the computer storage system, at least one non-volatile memory device, a cache acceleration layer configured to selectively accelerate the data files on the at least one database with the non-volatile memory device, and a management agent configured to provide a schematic view of the at least one database and entities therein to a user. The schematic view provides for the user to selectively choose the at least one database or at least one of the entities therein to individually accelerate. The management agent configures the cache acceleration layer to provide acceleration of the data files associated with the at least one database in response to a selection of the at least one database made by the user in the schematic view, and the management agent configures the cache acceleration layer to provide acceleration of an individual entity of the entities in response to a selection of the individual entity made by the user in the schematic view.

According to another aspect of the invention, a networked computer storage system includes a database having a plurality of data files, the database being a collection of instances located on more than one computer system node, and at least two interconnected computer system nodes. Each node includes at least one instance of the database, the nodes being in communication with one another such that the database synchronizes among the nodes, a database server application for managing the at least one database, at least one non-volatile memory device, a cache acceleration layer configured to selectively accelerate the data files on the at least one instance of the database with the non-volatile memory device, and a management agent configured to provide a schematic view of the at least one instance of the database to a user. The schematic view provides for the user to selectively choose the at least one database, one or more entities of the database, or one or more instances of the at least one database to accelerate. The management agent configures the cache acceleration layer to provide acceleration of the at least one database, one or more entities of the database, or one or more instances of the at least one database in response to a selection of the at least one database, one or more entities of the database, or one or more instances of the at least one database made by the user in the schematic view.

According to another aspect of the invention, a method of managing a database server application includes providing a schematic view of entities hosted by the database server application, the entities comprising a plurality of databases, file groups within the databases, and data files within the file groups, selecting one or more of the entities in the schematic view to accelerate accesses to file system data files corresponding to the one or more entities selected, and then accelerating the accesses to the file system data files associated with the one or more entities selected in response to selections made in the schematic view.

A technical effect of the invention is the ability to specify caching requirements in database server terminology such that entities such as databases, file groups, and/or files may be individually selected and accelerated by a user.

Other aspects and advantages of this invention will be better appreciated from the following detailed description.

BRIEF DESCRIPTION OF THE DRAWINGS

FIG. 1a represents a computer storage system of a type known in the art.

FIG. 1d represents a computer storage system in accordance with certain aspects of the present invention.

DETAILED DESCRIPTION OF THE INVENTION

Figure 1B:
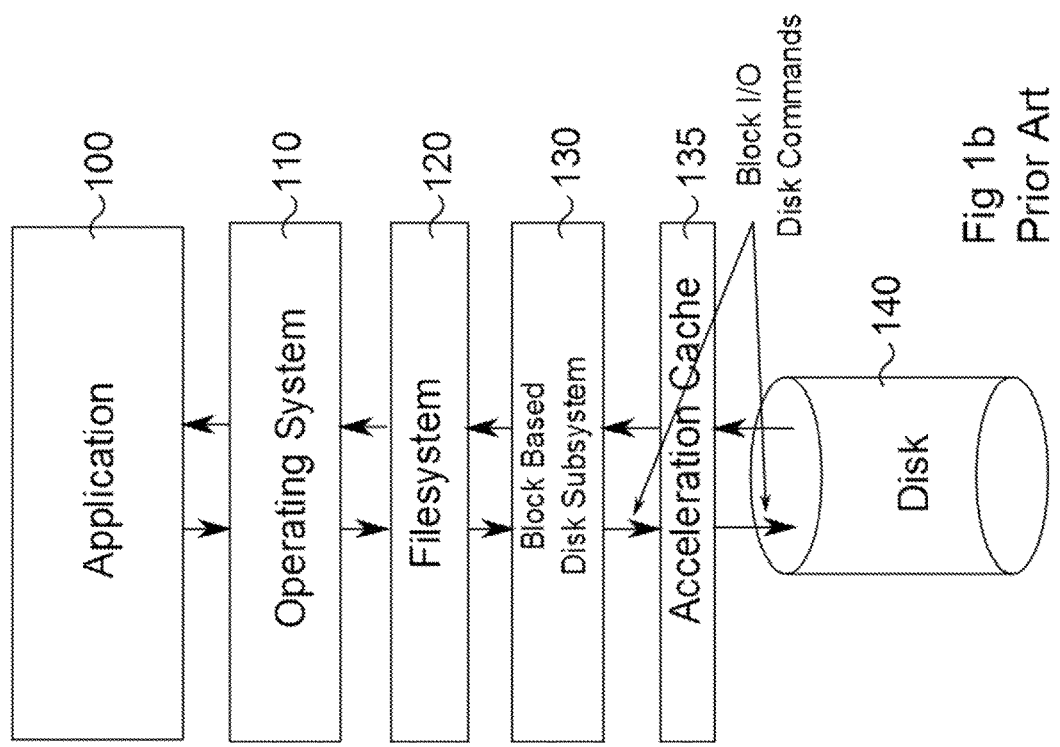
FIG. 1b represents a computer storage system having block I/O command-based acceleration of a type known in the art.
Figure 1C:
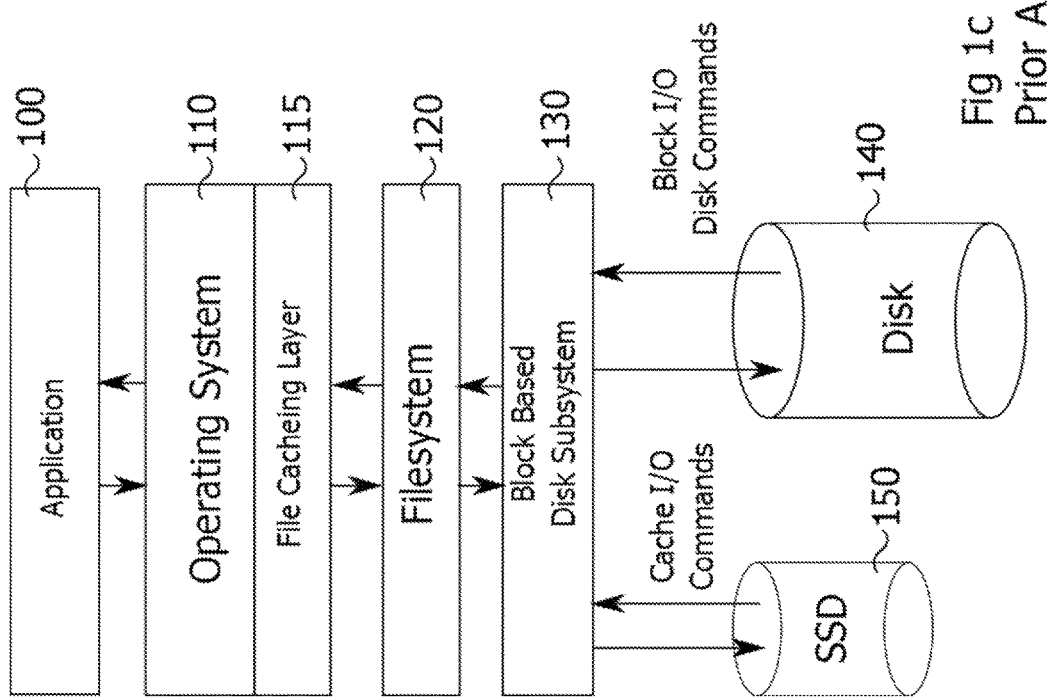
FIG. 1c represents a computer storage system having file-based data acceleration of a type known in the art.

The embodiments disclosed herein are only examples of the many possible advantageous uses and implementations of certain teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The present invention generally relates to a computer storage system or database system having a cache storage, preferably one or more non-volatile SSDs, integrated with a database server application to provide acceleration of file system data file accesses for specific databases, file groups, and/or files on the system. As used herein, a file group is a set of files and a database is a set of file groups. As such, the database system may take advantage of management features available in specific commercial products such as, but not limited to, Microsoft SQL Server®, which are generally not usable by file-based caching systems. It will be understood by those in the art that the invention is not limited to any particular product but may be applied to any application, particularly those that use a complex arrangement and structure of files and directories to store information. Embodiments disclosed herein provide a database system configured to provide users, including database administrators, methods by which they may specify caching requirements in database server terminology. The requirements may include, but are not limited to, which entities are to be accelerated from among a plurality of databases, file groups, and/or files. As used herein, database server terminology refers to organizational information as provided by a database server application regarding the databases, file groups, and files managed by the database server application as well as any other relevant information provided by the application. Since the user may specify caching requirements in terms of the database server terminology, the user may potentially specify caching requirements without knowledge of the identity of specific data files that are within specific databases and/or file groups. These requirements are translated to cache directives and communicated to a cache resource which then implements the specified requirements. The database system provides an efficient cache acceleration process by providing the user with relevant information and terminology, and thereby may improve a user's ability to precisely define requirements.

Figure 3:
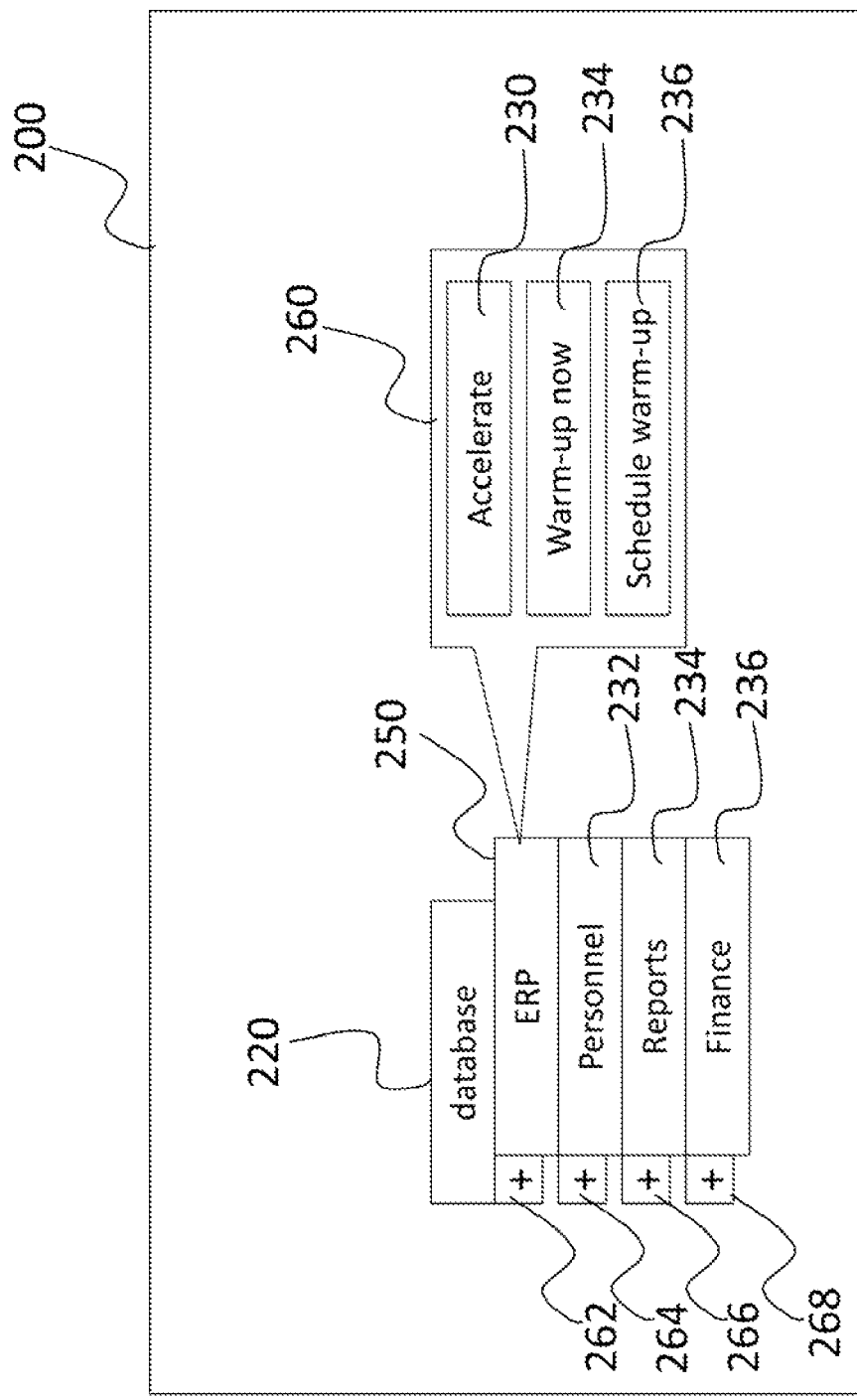
FIGS. 3 and 4 are schematic views representing functionality provided by the user interfaces of FIGS. 2a and 2b.
Figure 4:
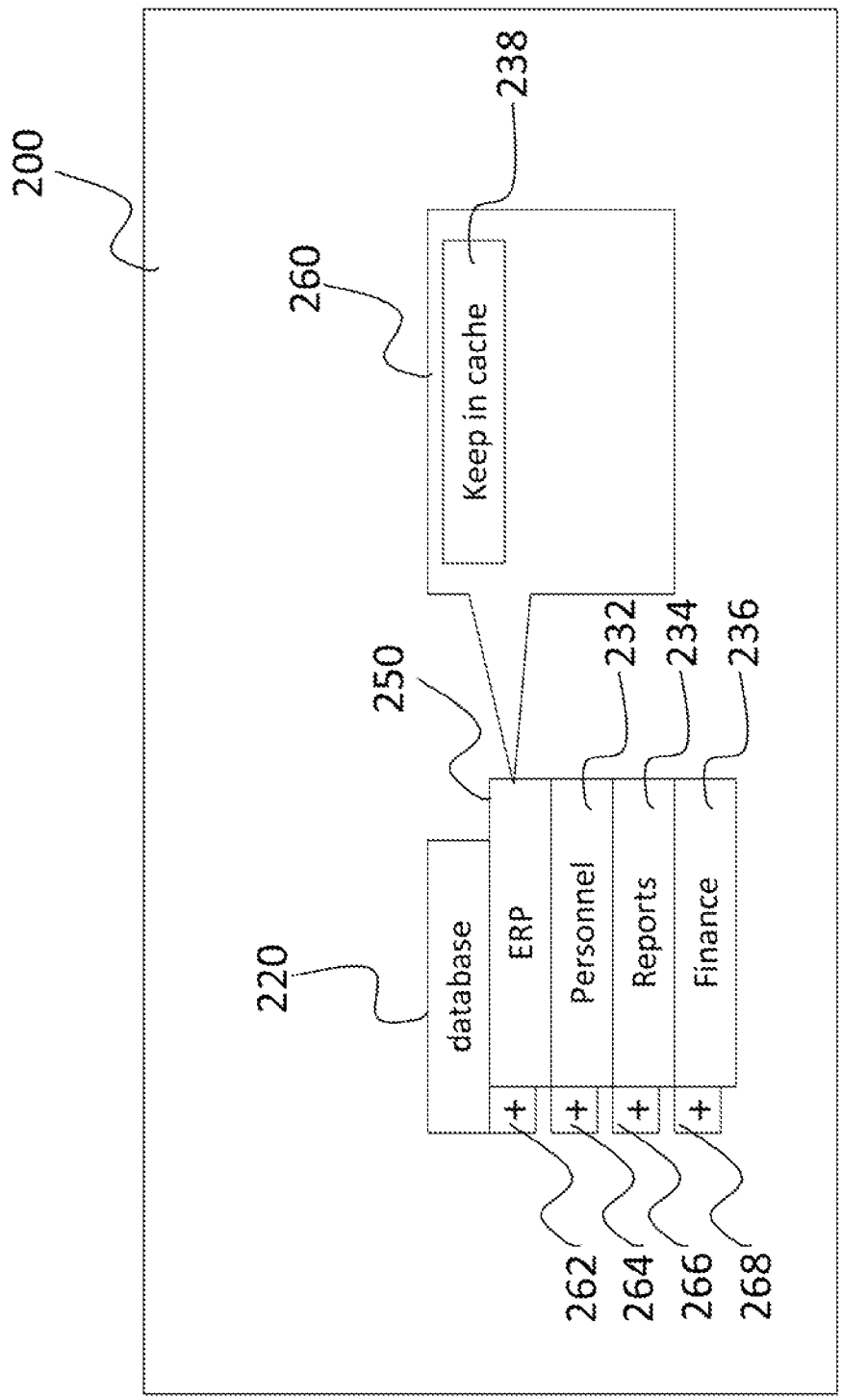
Figure 5:
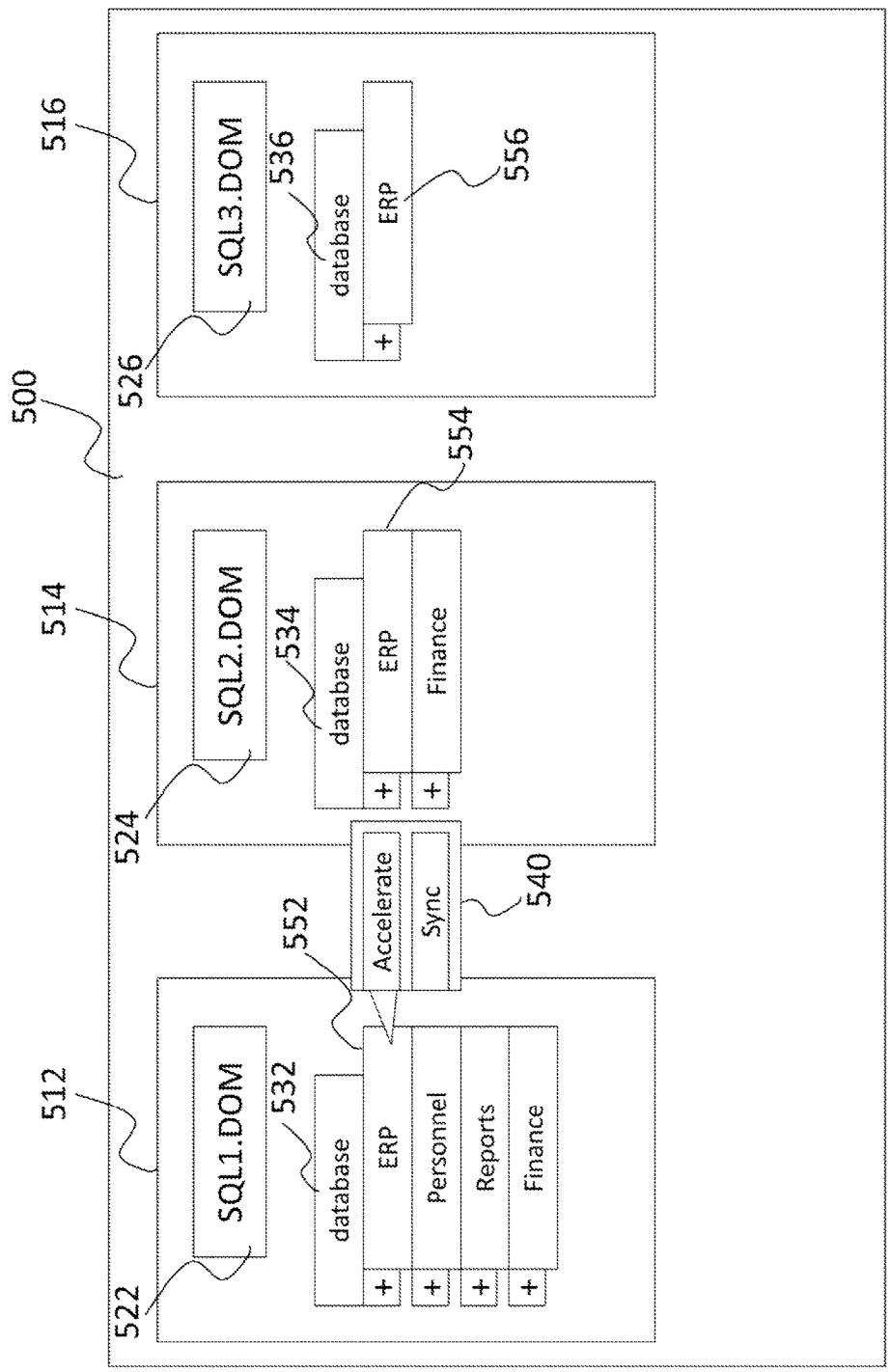
FIG. 5 is a schematic view representing a user interface of a primary database server application management shell on a system having an availability group configured in accordance with certain aspects of the present invention.

FIG. 1d is a schematic representing a computer storage system running a database server application 100, a particular but nonlimiting example being Microsoft SQL Server®. Communicating with the database server application 100 is a management agent 105, which uses a standard database API such as Open DataBase Connectivity (ODBC) or Java DataBase Connectivity (JDBC) to extract information from the database server application 100. This information enables the management agent 105 to provide schematic views of all entities hosted by the database server application 100, such as one or more databases, one or more file groups within those databases, and/or one or more files within those file groups, for example, as represented in FIGS. 2 through 4. If the database server application 100 operates as a cluster of instances on individual nodes connected by a network, the information may also enable the management agent 105 to provide schematic views of all of the entities hosted by the cluster of instances, for example, as represented in FIG. 5.

Figure 6:
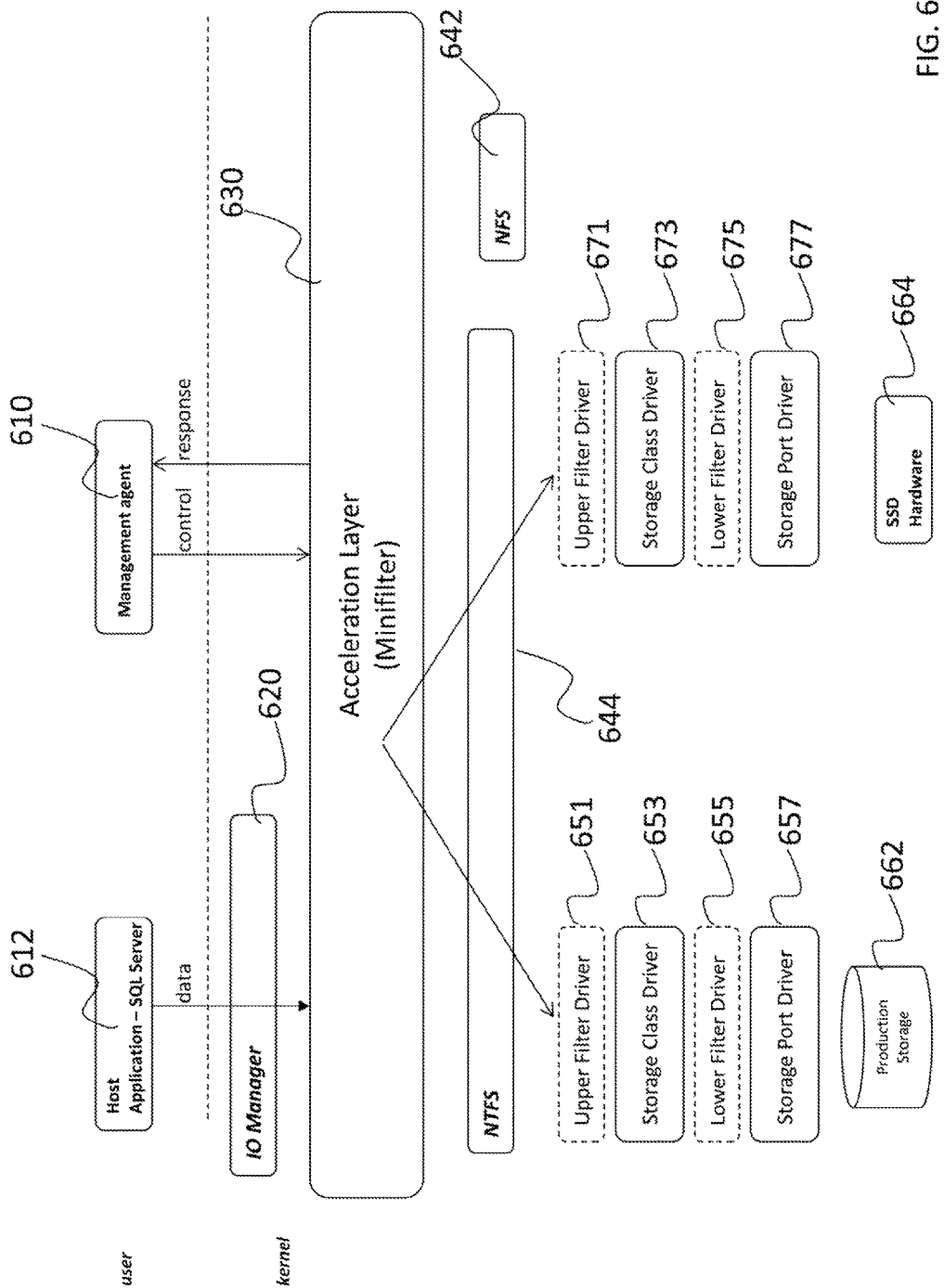
FIG. 6 is a block diagram representing a database acceleration implementation in accordance with certain aspects of the present invention.

FIG. 6 is a block diagram representing an acceleration process in accordance with aspects of the invention. Generally, a basic information element of a database server application, for example, SQL Server®, is a file. As such, the acceleration process represented in FIG. 6 is a file-based acceleration process.

According to one aspect of the invention, an acceleration layer 630, for example, Windows® Minifilter, is used to store a cache engine. The cache engine forks file level information between a file hosted on a production storage 662 and a cache file hosted on flash-based device (SSD) 664. One or more file systems, for example, NTFS 644 or NFS 642, may be deployed between the acceleration layer 630 and storage filter stacks 651-657 and 671-677 to the production storage 662 and the SSD 664, respectively.

According to another aspect of the invention, commands sent from a database server application 612 via an IO manager 620 are forked in the acceleration layer 630 according to whether the commands are to be accelerated or not-accelerated. Commands for non-accelerated entities are sent via the driver stack composed of an upper filter driver 651, a storage class driver 653, a lower filter driver 655, and a storage port driver 657 to the production storage 662. Commands for accelerated entities are sent via the driver stack composed of an upper filter driver 671, a storage class driver 673, a lower filter driver 675, and a storage port driver 677 to a cache area in the SSD 664.

Figure 7:
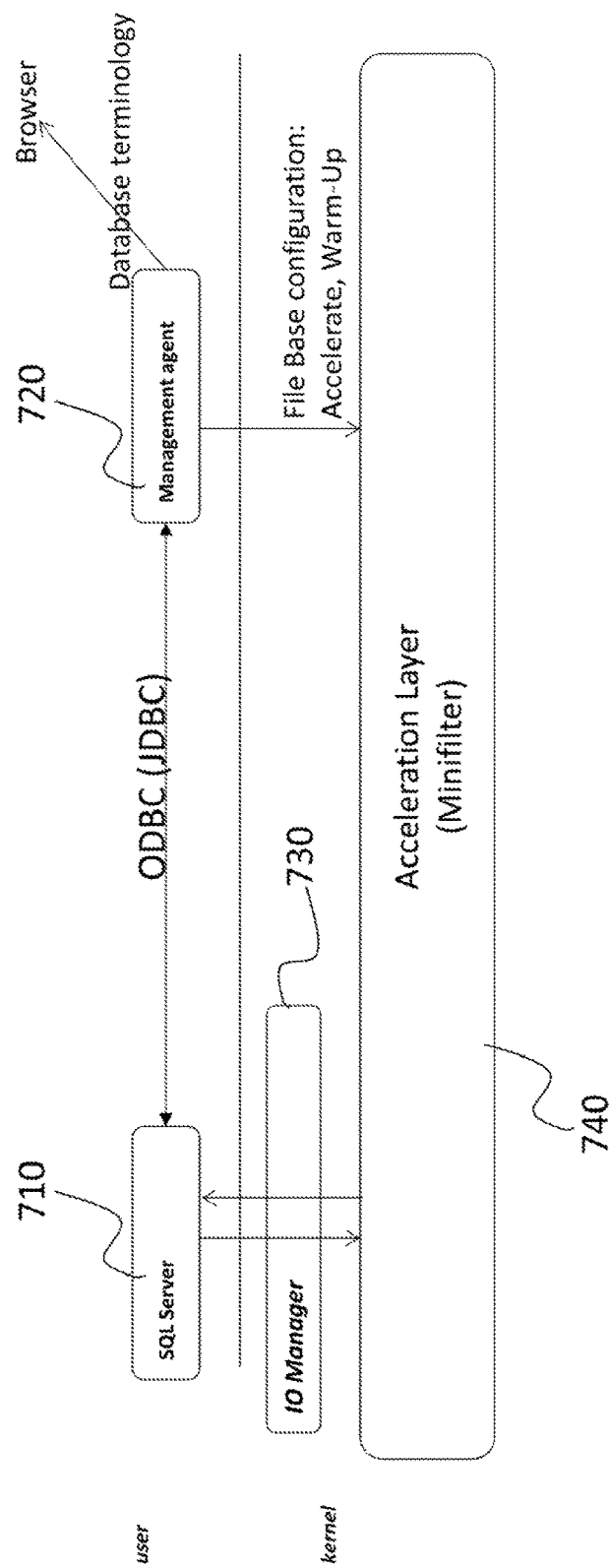
FIG. 7 is a block diagram representing database server application integration with acceleration modules in accordance with certain aspects of the present invention.

According to one aspect of the invention, a management agent 610 in the user space is used to send control directives to the cache engine in the minifilter of the acceleration layer 630. The management agent 610 is responsible for sending configuration commands to the cache engine of the acceleration layer 630 and to receive statuses and other information (monitoring, statistics) from the cache engine. FIG. 7 represents connectivity to a database application server, represented here as an SQL server 710, which communicates file commands via an IO manager 730 to the cache engine in an acceleration layer 740 (for example, Windows® Minifilter). According another aspect of the invention, a management agent 720 is configured to open a communications channel to the SQL server 710 (via, for example, ODBC or JDBC APIs) and extract all relevant information of any databases being controlled by the SQL server 710. This information (i.e., databases, file groups, and files) can be provided to the user via a browser or any other graphical user interface (GUI) utility. Preferably, the user's selections from the management GUI are translated from database terminology to cache directives by the management agent 720 and sent to the cache engine in the minifilter of the acceleration layer 740.

Referring now to FIGS. 2-4, from the schematic views provided by the management agent 105, the user (not shown) may interact with a GUI (not shown) associated with the management agent 105 (FIG. 1*d*) to select individual entities hosted by the database server application 100, such as one or more databases, one or more file groups within those databases, and/or one or more files within those file groups. The management agent 105 may then communicate selections made by the user to a file-based cache acceleration layer 115. By presenting the user with a schematic view which is familiar to the user in terms of the structure and organization of entities hosted by the database server application 100, the management agent 105 can relate the user's selections to the specific files that the database server application 100 uses for the implementation of the various components of the database. The management agent 105 may then configure the cache acceleration layer 115 to provide acceleration of files within the databases according to the user's selections of entities from the schematic view.

Figure 2A:
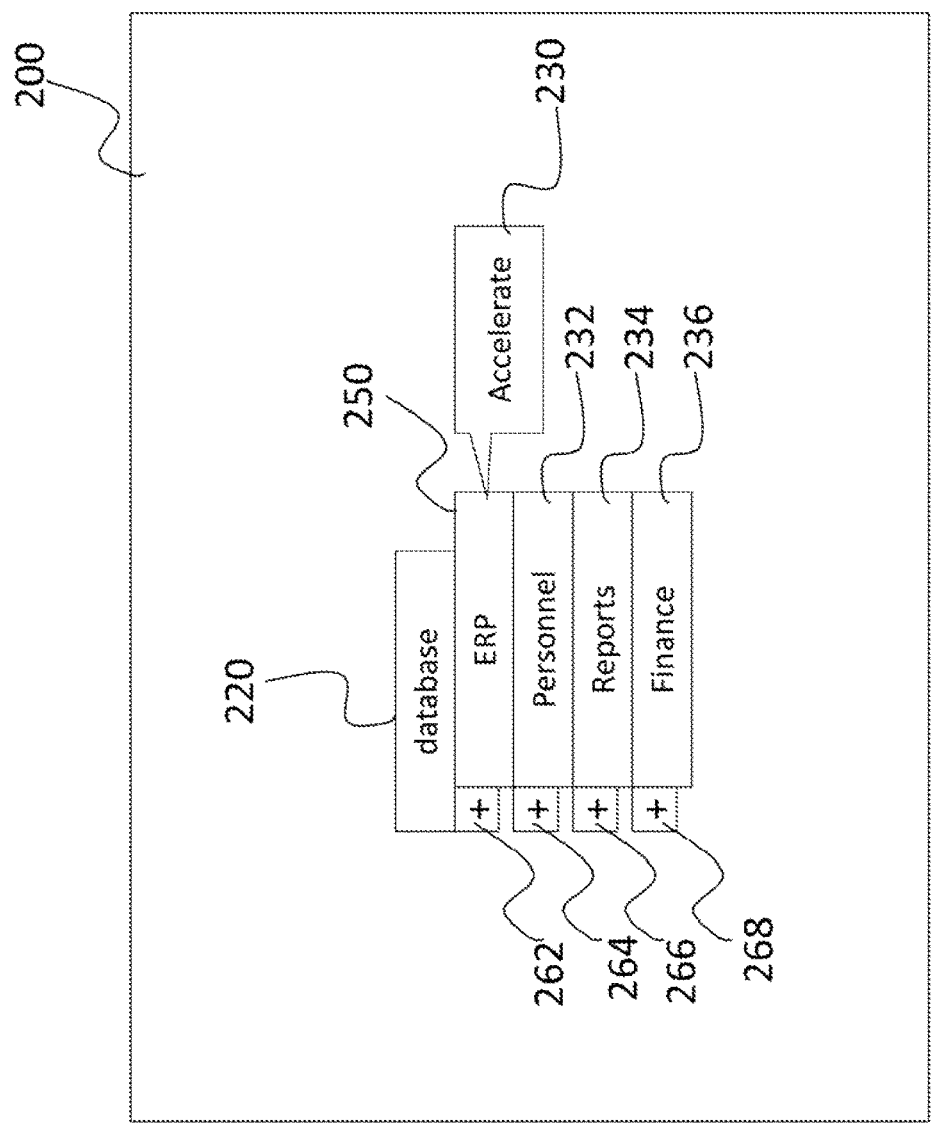
FIGS. 2a and 2b are schematic views representing a user interface of a primary database server application management shell in accordance with certain aspects of the present invention.

FIG. 2*a* is a schematic representing the user interface of a primary shell 200 of the management agent 105. The terminology presented to the user in this configuration phase may be the same terminology employed by the database server application 100. The primary shell 200 shows all the databases in the application server 100 in a database bar 220. In this nonlimiting example, the database bar 220 includes databases ERP 250, Personnel 232, Reports 234, and Finance 236. Interacting with a selected database, for example, by right clicking on the database, may open an acceleration directive (accelerate 230) which, if selected, provides acceleration of the entire selected database. As represented in FIG. 2*a*, the user can accelerate database ERP 250 by selecting the accelerate 230. In this situation, the acceleration mechanism preferably accelerates only the selected databases.

Figure 2B:
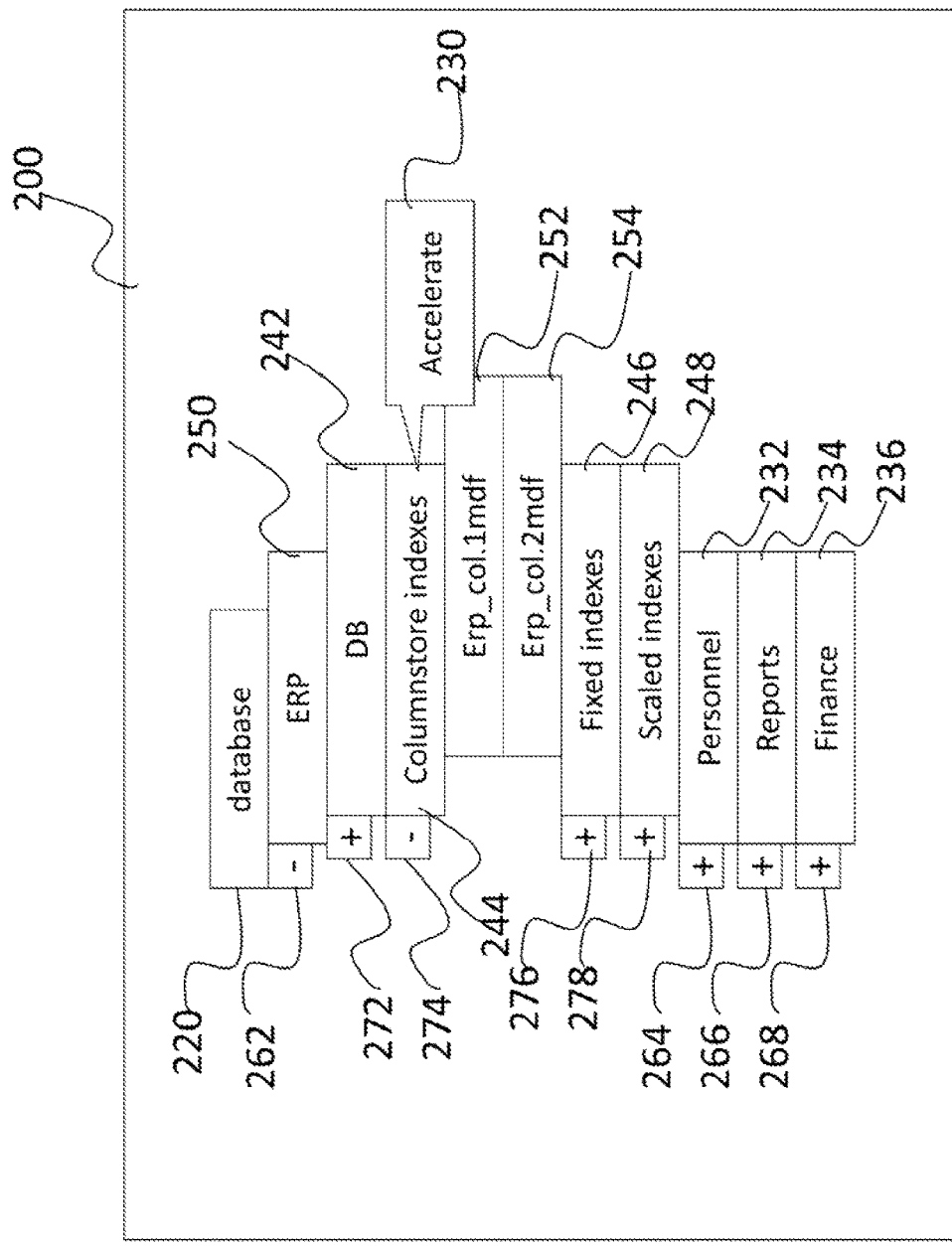

Preferably, the user can view individual entities within the database, that is, open the selected database for more details. As represented in FIG. 2*a*, each database appearing in the user interface has an associated "+" button, e.g., database ERP 250 has "+" button 262, that expands the database bar 220 to provide the user with a schematic view of the entities of the selected database. FIG. 2*b* represents the "+" button 262 of the database ERP 250 as having been pressed (and therefore represented as a "−" button) to expand the database bar 220 to show file groups DB 242, Columnstore Indexes 244, Fixed Indexes 246, and Scaled Indexes 248, which are within the database ERP 250. Each file group also has an associated "+" button that may be pressed to reveal files within the file group. For example, FIG. 2*b* represents the result of pressing the "+" button 274 of file group Columnstore Indexes 244 to show files Erp_col.1mdf 252 and Erp_col.2mdf 254, which are both within the file group Columnstore Indexes 244.

Preferably, the user can select to accelerate entities at any level shown in the primary shell 200. For example, a selection to accelerate any individual entity in the user interface can indicate to the cache acceleration layer 115 to accelerate all files associated with the selected entity. Therefore, selecting a database to accelerate will result in accelerated access to all the file groups within the selected database and hence all the files within each of the file groups. Likewise, selection of a single file group to accelerate will result in accelerated access to all of the files within the single selected file group.

FIG. 3 represents additional functionality that may be provided to the user. Preferably, the user can interact with, for example, by right clicking, any entity such as a database, file group, or file and thereby be provided a further selection list 260 displaying a selection of features that are relevant to the selected entity. For example, the user can use a "warm-up now" directive 234 to "warm up" the cache, that is, insert file cache entries directly into the cache without a corresponding file access, or schedule such warm-up activity by selecting a "schedule warm-up" directive 236. Other features may be relevant depending on the entity and therefore the selection list 260 can include any relevant feature related to the selected entity. For example, features that are relevant to databases may be presented when a database is selected, features that are relevant to file groups may be presented when a file group is selected, and features that are relevant to files may be presented when a file is selected.

It is foreseeable that functions other than those described herein may be relevant to one or more databases, file groups, or files, and therefore may be included in the selection list 260 for those relevant entities. Therefore, other advanced directives can be set to each entity. As represented in FIG. 4, the primary shell 200 enables advanced options to be set per each entity. For example, a "keep in cache" directive 238 can be set to instruct the cache acceleration layer 115 to prefer to retain this cache entry information.

A recent version of Microsoft SQL Server® introduced a concept of an "availability group." An availability group supports a failover environment for a discrete set of user databases, known as availability databases, that failover together, that is, where a seamless switch over to an active member of the availability group will happen in the event that a member of the group fails or becomes inactive (e.g., for maintenance). An availability group supports a set of read-write primary databases and one to eight sets of corresponding secondary databases. Optionally, secondary databases can be made available for read-only access and/or some backup operations. As a result, a database may not be hosted by an individual database server application instance, but a plurality of instances which can be connected over a network.

Figure 8:
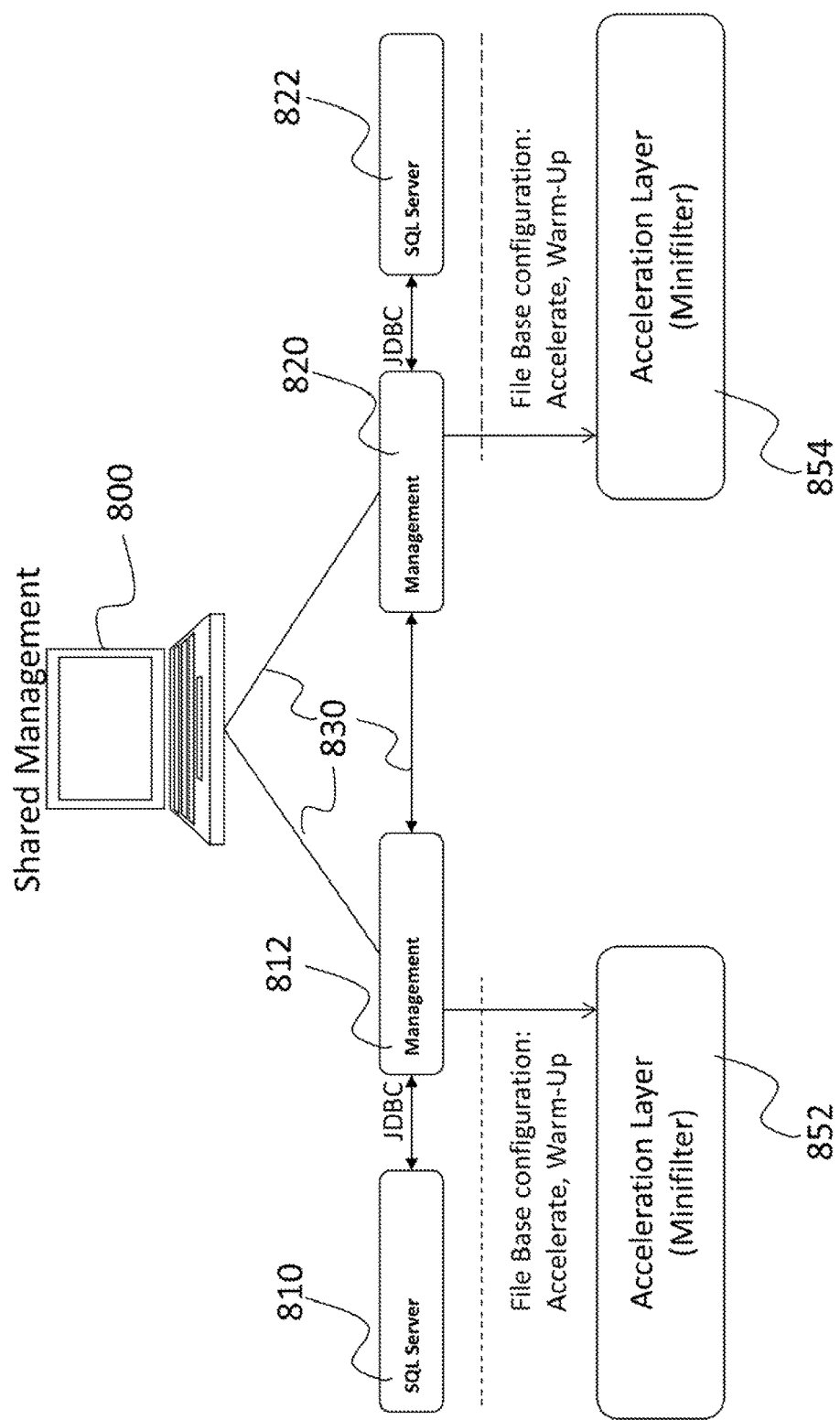
FIG. 8 is a block diagram representing integration of availability group modules in accordance with certain aspects of the present invention.

As represented in FIG. 8, which depicts a nonlimiting example of a server availability group configuration, every database server application instance, referred to here as SQL servers 810 and 822, is preferably in communication with a dedicated management agent 812 or 820. Preferably, each node within the availability group includes runs a local database server application instance and a local management agent. Each management agent 812 and 820 may extract information from the local SQL server 810 or 822 in which it is in communication with. Management agents 812 and 820 are connected over a management network 830 and to corresponding local node cache engines in acceleration layers 852 and 854 (for example, Windows® Minifilter) to configure the operation of the cache engine in terms of acceleration, warm up, and other relevant parameters. Preferably, a single management shell 800 (using, for example, a browser) can connect to any of the management agents 812 and 820, extract any relevant information, and configure all the management agents 812 and 820, thereby providing a single point of management. According to another aspect of the invention, the cache engines of the acceleration layers 852 and 854 are configured to communicate with each other to transfer data such as cache hot zones, control information, and other relevant information.

According to an aspect of the invention, if an availability group is configured, the primary management shell may include all nodes in the availability group. As represented in FIG. 5, a primary shell 500 includes nodes SQL1.DOM 522, SQL2.DOM 524, and SQL3.DOM 526. Each node is represented on the shell 500 with its corresponding database bars 532, 534, and 536, respectively.

Preferably, a subshell is provided for every node (e.g., sub shells 512, 514, and 516 for nodes SQL1.DOM 522, SQL2.DOM 524 and SQL3.DOM 526, respectively) that enables autonomous node configuration. Each entity within the database bars 532, 534, and 536 can be separately configured for acceleration or any other functionality provided.

According to an aspect of the invention, availability group functionality may be provided for each entity. For example, a "sync" directive 540 may be provided to synchronize the ERP databases 552, 554, and 556 between nodes 522, 524 and 526, respectively. By activating the sync directive 540, the user can synchronize cache information between databases shared by a plurality of nodes.

In view of the above, the database system and methods described herein provide an efficient cache acceleration process by providing the user with relevant information and terminology and thereby improving the user's ability to precisely define requirements. In addition, providing the user with the ability to define caching requirements in database server terminology, the system is capable of implementing various features now available to database server applications, such as SQL Server®, which would otherwise be unusable or difficult to implement with conventional computer storage systems.

While the invention has been described in terms of specific embodiments, it is apparent that other forms could be adopted by one skilled in the art. For example, the configuration and content of the network, shells, sub-shells databases, file groups, files, etc. could differ from those shown, other functionality of these entities may be provided, and processes other than those noted could be used. Therefore, the scope of the invention is to be limited only by the following claims.

The invention claimed is:

1. A computer storage system comprising:
   at least one database comprising a plurality of database entities, wherein each of the plurality of database entities comprises one or more file system data files;
   a database server application configured to manage the at least one database, the database server application configured to run on the computer storage system;
   at least one memory device;
   a file system layer between the database server application and the at least one database and configured to provide access to the one or more file system data files of a given database entity of the plurality of database entities;
   an operating system layer between the database server application and the file system layer and configured to provide access to the one or more file system data files of a given database entity of the plurality of database entities;
   a cache acceleration layer between the operating system layer and the file system layer and configured to selectively accelerate file system accesses by the operating system layer to the one or more file system data files of each of the plurality of database entities of the at least one database using the memory device; and
   a management agent configured to provide a schematic view of the at least one database and the plurality of database entities therein to a user, the schematic view comprising a user interface to receive a user selection of one of the at least one database or at least one of the plurality of database entities therein to individually accelerate accesses to;
   wherein the management agent is further configured to translate the user selection into one or more cache directives and transmit the one or more cache directives to the cache acceleration layer to accelerate accesses to the selected one of the at least one database or the at least one of the plurality of database entities therein using the memory device,
   the file system layer and cache acceleration layer are external to both the at least one database and the database server application, and
   wherein the memory device is a cache storage device.

2. The computer storage system of claim 1, wherein the at least one database corresponds to at least two databases each comprising the plurality of database entities,
   the schematic view provided by the management agent displays the at least two databases and the plurality of database entities therein for the user to selectively choose, via the interface, an individual database from among the at least two databases or at least one of the plurality of database entities therein to accelerate accesses to.

3. The computer storage system of claim 1, wherein the schematic view provided by the management agent displays at least one file group of the at least one database for the user to selectively choose to accelerate accesses to, the at least one file group comprising more than one of the one or more file system data files,
   and the management agent is configured to translate and transmit the user's selection of the file group or the more than one of the one or more file system data files of the file group to accelerate access to the cache acceleration layer to provide accelerated accesses to acceleration of the selected file system data files or the file group.

4. The computer storage system of claim 1, wherein the management agent is configured to communicate with the database server application and extract information therefrom identifying the at least one database and the plurality of database entities therein.

5. The computer storage system of claim 1, wherein the database server application is configured to transmit commands to the cache acceleration layer, and the cache acceleration layer is configured to determine whether the commands are associated with an accelerated database or an individually accelerated entity within the database.

6. The computer storage system of claim 5, wherein
   if it is determined that the commands are associated with the accelerated database or individually accelerated entity within the database, the cache acceleration layer is further configured to send the commands to the memory device, and
   if it is determined that the commands are not associated with the accelerated database or individually accelerated entity within the database, the cache acceleration layer is further configured to send the commands to a production storage storing at least a portion of the at least one database.

7. The computer storage system of claim 1, wherein the user interface of the schematic view further includes a selection of advanced directives for the chosen at least one database or the at least one of the database entities therein, the selection of advanced directives comprising at least one of a "warm-up now" directive, a "schedule warm-up" directive, and a "keep in cache" directive.

8. The computer storage system of claim 1, wherein the cache acceleration layer anonymously accelerates the user's selection.

9. A networked computer storage system comprising:
a database comprising a plurality of file system data files, the database being a collection of instances located on more than one interconnected computer system node; and
at least two interconnected computer system nodes, each interconnected computer system node comprising:
at least one instance of the database, the interconnected computer system nodes being in communication with one another such that the database can be synchronized among the interconnected computer system nodes;
a database server application configured to manage the at least one instance of the database;
at least one memory device;
a file system layer between the database server application and the at least one instance of the database and configured to provide access to the plurality of file system data files of each of the at least two interconnected computer system node;
an operating system layer between the database server application and the file system layer and configured to provide access to the plurality of file system data files of each of the at least two interconnected computer system node;
a cache acceleration layer between the operating system layer and the file system layer and configured to selectively accelerate file system accesses by the operating system layer to the plurality of file system data files of the at least one instance of the database with using the memory device; and
a management agent configured to provide a schematic view for a user's selection of the database, one or more of a plurality of database entities, wherein each of the plurality of database entities comprises one or more file system data files, of the database, or one or more instances of the database to accelerate accesses to;
wherein the management agent is further configured to translate the user's selection into one or more cache directives and transmit the one or more cache directives to the cache acceleration layer to accelerate accesses to the user's selection,
the file system layer and cache acceleration layer are external to both the at least one instance of the database and the database server application, and
wherein the at least one memory device is a cache storage device.

10. The networked computer storage system of claim 9, wherein the management agent is configured to communicate with the database server application and extract information therefrom identifying the at least one instance of the database and database entities therein.

11. The networked computer storage system of claim 9, further comprising a management shell in communication with the management agent on each node and configured to provide a broad schematic view of all databases and database entities therein on the at least two computer system nodes to the user, the broad schematic view comprising a user interface for the user to selectively choose an individual database or an individual entity on an individual node from among the databases on the at least two computer system nodes to accelerate accesses to.

12. The networked computer storage system of claim 9, wherein the database server application of each node is configured to transmit commands to their respective cache acceleration layers, and the cache acceleration layers are configured to determine whether the commands are associated with an accelerated database, one or more accelerated database entities of the database, or accelerated one or more instances of the at least one database.

13. The networked computer storage system of claim 12, wherein
if it is determined that the commands are associated with the accelerated database, one or more accelerated database entities of the database, or accelerated one or more instances of the at least one database, the cache acceleration layers are further configured to send the commands to the memory device, and
if it is determined that the commands are not associated with accelerated database, one or more accelerated database entities of the database, or accelerated one or more instances of the at least one database, the cache acceleration layers are further configured to send the commands to a production storage storing at least a portion of the database.

14. The networked computer storage system of claim 9, wherein the user interface of the schematic view further includes a selection of advanced directives for the chosen at least one database, one or more database entities of the database, or one or more instances of the at least one database, the selection of advanced directives comprising at least one of a "warm-up now" directive, a "schedule warm-up" directive, and a "keep in cache" directive.

15. The networked computer storage system of claim 9, wherein the computer system nodes are configured to synchronize the database among the nodes in response to a "sync" directive.

16. The networked computer storage system of claim 9, wherein the cache acceleration layer anonymously accelerates accesses to the user's selection.

17. A method of managing a database server application, the method comprising:
identifying database entities hosted by the database server application via a file system layer between the database server application and the database entities, the database entities comprising a plurality of databases, file groups within the databases, and file system data files within the file groups;
providing, via a management agent in communication with the database server application, a schematic view of the database entities hosted by the database server application;
receiving, via a user interface associated with the schematic view, a selection of one or more of the database entities in the schematic view to accelerate accesses to using a memory device;
translating, by the management agent, the selection of the one or more of the database entities into one or more cache directives;
providing, via an operating system layer between the database server application and the file system layer, access to the database entities; and
transmitting, via the management agent, the one or more cache directives to a cache acceleration layer between the operating system layer and the file system layer to accelerate accesses to the selected one or more of the database entities using the memory device, wherein the file system layer and the cache acceleration layer are external to both the plurality of databases and the database server application, and wherein the memory device is a cache storage device.

18. The method of claim 17, further comprising communicating with a database server application to extract therefrom information regarding the database entities of which the database server application manages, wherein the schematic view is provided based on the information.

19. The method of claim 17, further comprising:

transmitting commands to the cache acceleration layer, and determining, by the cache acceleration layer, whether the commands are associated with an accelerated entity.

20. The method of claim 19, further comprising:

sending the commands to the memory device if it is determined that the commands are associated with the accelerated entity; and sending the commands to a production storage storing at least a portion of the database entities if it is determined that the commands are not associated with the accelerated entity.

21. The method of claim 17, further comprising:

receiving, via the user interface associated with the schematic view, a selection of an advanced directive for one or more of the database entities, the advanced directive comprising at least one of a "warm-up now" directive, a "schedule warm-up" directive, and a "keep in cache" directive.

22. The method of claim 17, further comprising:

anonymously accelerating, by the cache acceleration layer, the selection.

* * * * *